United States Patent
Kaburagi

(10) Patent No.: US 12,438,401 B2
(45) Date of Patent: Oct. 7, 2025

(54) POWER RECEPTION APPARATUS AND CONTROL METHOD

(71) Applicant: CANON KABUSHIKI KAISHA, Tokyo (JP)

(72) Inventor: Izumi Kaburagi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 624 days.

(21) Appl. No.: 17/938,866

(22) Filed: Oct. 7, 2022

(65) Prior Publication Data

US 2023/0111339 A1    Apr. 13, 2023

(30) Foreign Application Priority Data

Oct. 11, 2021    (JP) ................... 2021-166917

(51) Int. Cl.
| | |
|---|---|
| *H02J 7/00* | (2006.01) |
| *H02J 50/20* | (2016.01) |
| *H02J 50/40* | (2016.01) |
| *H02J 50/80* | (2016.01) |
| *H02J 13/00* | (2006.01) |

(52) U.S. Cl.
CPC ............ *H02J 50/402* (2020.01); *H02J 50/20* (2016.02); *H02J 50/80* (2016.02); *H02J 13/00036* (2020.01)

(58) Field of Classification Search
None
See application file for complete search history.

(56) References Cited

U.S. PATENT DOCUMENTS

| | | | |
|---|---|---|---|
| 11,289,952 B1 * | 3/2022 | Melone ............ | H02J 13/00026 |
| 2013/0249309 A1 * | 9/2013 | Miwa ................. | H02J 50/80 |
| | | | 307/104 |
| 2014/0091787 A1 * | 4/2014 | Hyodo ................. | G01V 3/105 |
| | | | 324/236 |

FOREIGN PATENT DOCUMENTS

JP    20170085700 A    5/2017

OTHER PUBLICATIONS

Draft Report of the Working Group on Wireless Power Transmission Systems of Spatial Transmission Type (May 20, 2020, 16:00 edition), Information and Communications Council, Department on Information and Communications Technology, Land Radiocommunication Subcommittee, p. 3-p. 4.

* cited by examiner

*Primary Examiner* — Arun C Williams
(74) *Attorney, Agent, or Firm* — Canon U.S.A., Inc. IP Division

(57) ABSTRACT

A power reception apparatus that receives power wirelessly transmitted from a power transmission apparatus, and controls a first wireless communication unit, a second wireless communication unit and a switching unit. When the first wireless communication unit is connected to the power transmission apparatus, the control unit controls the switching unit to switch the connection destination of the second antenna from the second wireless communication unit to the power reception unit, and communicates with the power transmission apparatus using the first wireless communication unit such that the power transmission apparatus starts transmitting power after the second antenna is connected to the power reception unit.

8 Claims, 5 Drawing Sheets

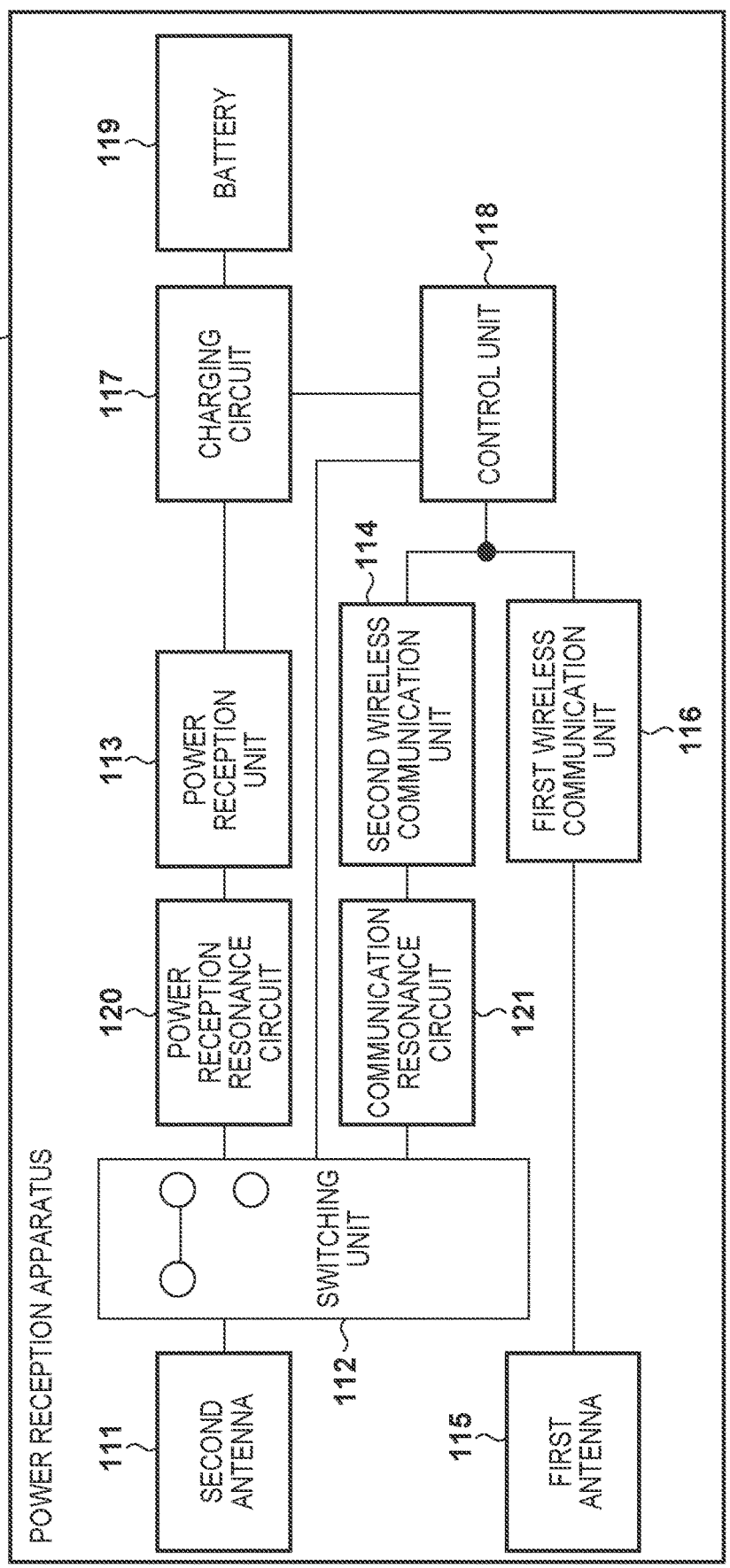

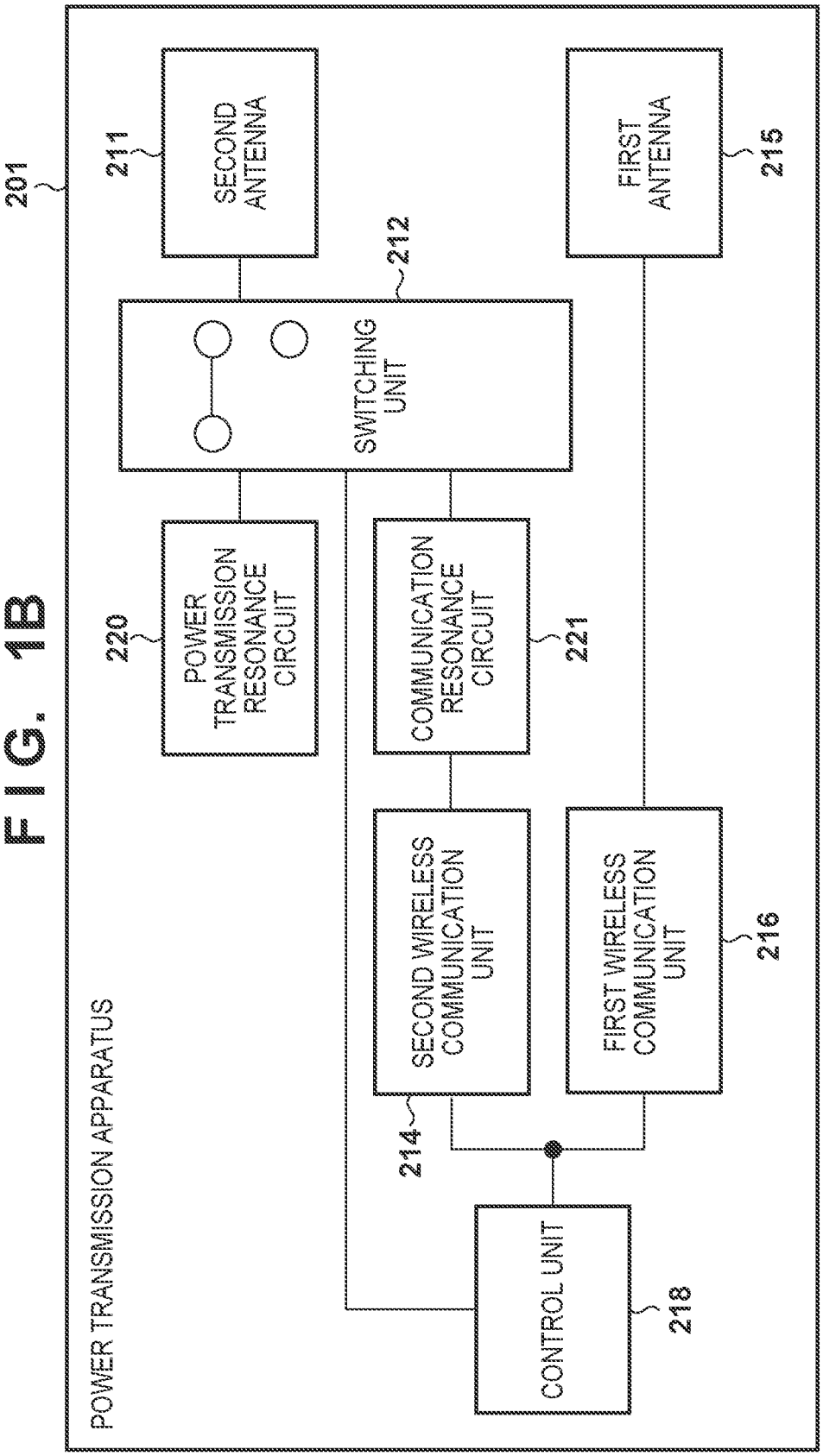

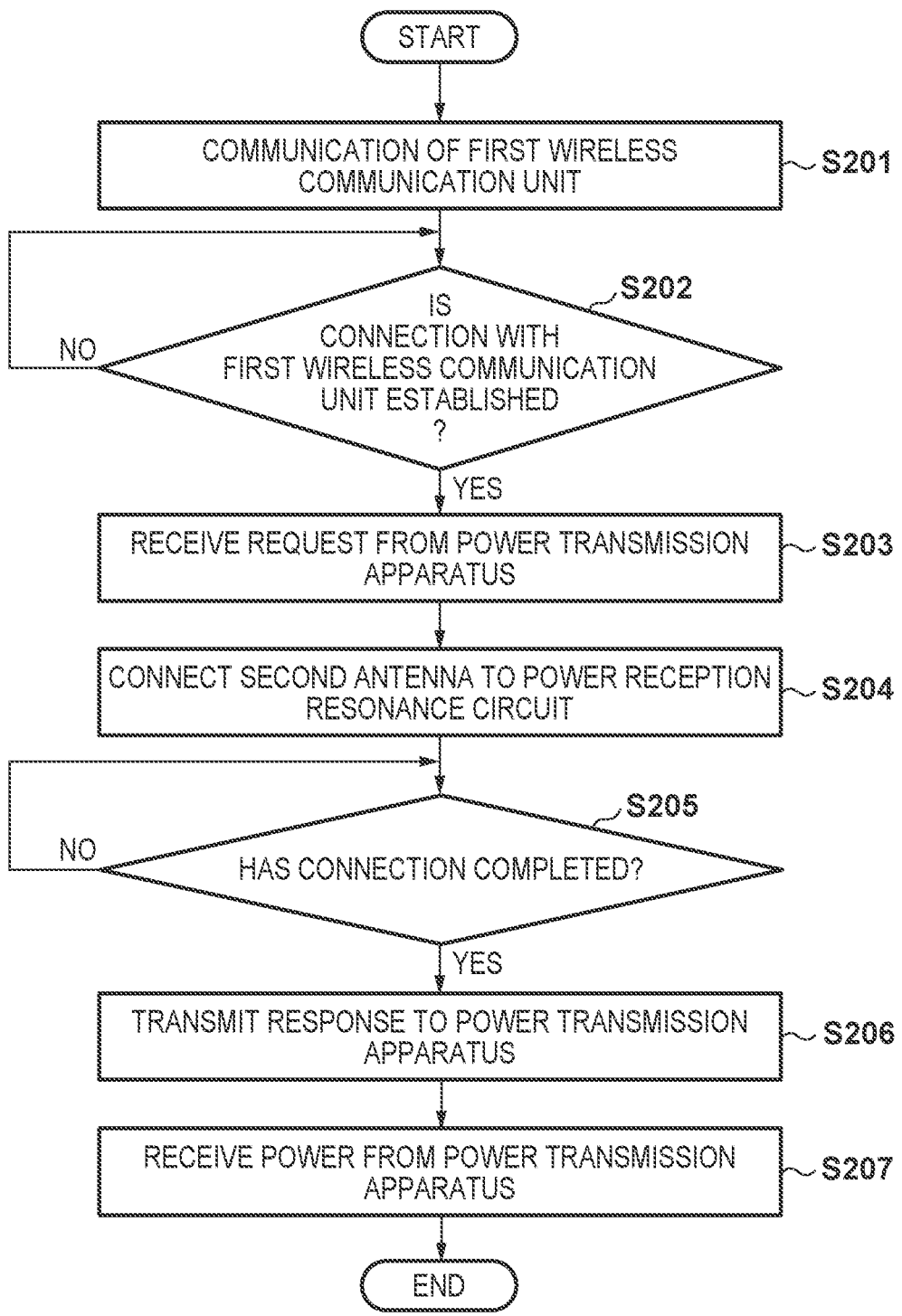

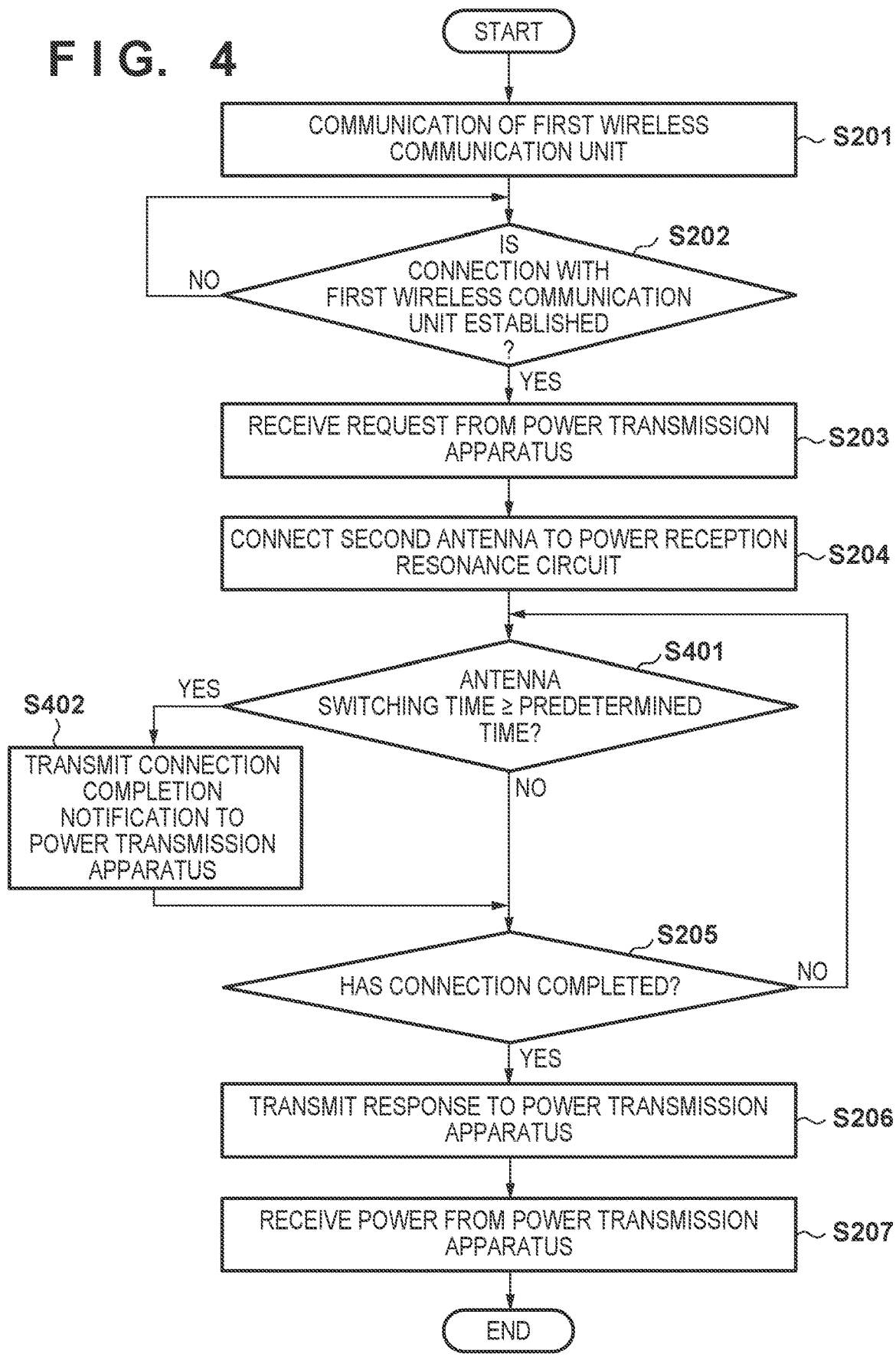

POWER RECEPTION APPARATUS AND CONTROL METHOD

BACKGROUND

Field

The present disclosure relates to techniques for transmitting and receiving power wirelessly using microwaves.

Description of the Related Art

A wireless power transmission system of the spatial transmission type, proposed by the Ministry of Internal Affairs and Communications, is expected to be deployed in a wide range of markets due to it being able to transmit power using the 2.4 GHz band frequency used for wireless LANs and the like, as described in the draft report of the Working Group on Wireless Power Transmission Systems of Spatial Transmission Type (May 20, 2020, 16:00 edition), Information and Communications Council, Department on Information and Communications Technology, Land Radiocommunication Subcommittee.

Japanese Patent Laid-Open No. 2017-085700 describes a power transmission apparatus that, in an apparatus including a power transmission antenna and a communication antenna, disconnects the power transmission antenna from a power transmission unit when switching from power transmission to communication, and disconnects the communication antenna from a communication unit when switching from communication to power transmission.

In contrast to Japanese Patent Laid-Open No. 2017-085700, there are apparatuses that use a common antenna as a wireless power reception antenna and a wireless communication antenna, and perform wireless power reception and wireless communication by switching the connection destination of the antenna between a wireless power reception circuit and a wireless communication circuit. In such an apparatus, it is necessary to switch the connection destination of the antenna at an appropriate time to ensure overvoltage caused by the reception of power transmission radio waves during wireless communication is not applied. In addition, measures such as ensuring the wireless communication circuit has a high breakdown voltage are necessary for situations where overvoltage is applied to the wireless communication circuit due to power transmission, which increases costs.

SUMMARY

Various embodiments of the present disclosure realize a technique which makes it possible to receive power while switching the connection destination of an antenna at an appropriate time without increasing costs.

In order to solve the aforementioned problems, various embodiments of the present disclosure provide a power reception apparatus that receives power wirelessly transmitted from a power transmission apparatus, the power reception apparatus comprising: a first wireless communication unit configured to perform first wireless communication with the power transmission apparatus using a first antenna; a second wireless communication unit configured to perform second wireless communication with the power transmission apparatus using a second antenna; a power reception unit configured to receive the power from the power transmission apparatus using the second antenna; a switching unit configured to switch a connection destination of the second antenna to the second wireless communication unit or the power reception unit; and a control unit configured to control the first wireless communication unit, the second wireless communication unit, and the switching unit, wherein when the first wireless communication unit is connected to the power transmission apparatus, the control unit controls the switching unit to switch the connection destination of the second antenna from the second wireless communication unit to the power reception unit, and communicates with the power transmission apparatus using the first wireless communication unit such that the power transmission apparatus starts transmitting power after the second antenna is connected to the power reception unit.

In order to solve the aforementioned problems, various embodiments of the present disclosure provide a method of controlling a power reception apparatus that receives power wirelessly transmitted from a power transmission apparatus, wherein the power reception apparatus comprises: a first wireless communication unit configured to perform first wireless communication with the power transmission apparatus using a first antenna; a second wireless communication unit configured to perform second wireless communication with the power transmission apparatus using a second antenna; a power reception unit configured to receive the power from the power transmission apparatus using the second antenna; a switching unit configured to switch a connection destination of the second antenna to the second wireless communication unit or the power reception unit; and a control unit configured to control the first wireless communication unit, the second wireless communication unit, and the switching unit, and the method comprises: when the first wireless communication unit is connected to the power transmission apparatus, controlling the switching unit to switch the connection destination of the second antenna from the second wireless communication unit to the power reception unit; and communicating with the power transmission apparatus using the first wireless communication unit such that the power transmission apparatus starts transmitting power after the second antenna is connected to the power reception unit.

In order to solve the aforementioned problems, various embodiments of the present disclosure provide a non-transitory computer-readable storage medium storing a program for causing a processor to function as a power reception apparatus that receives power wirelessly transmitted from a power transmission apparatus, the power reception apparatus comprising: a first wireless communication unit configured to perform first wireless communication with the power transmission apparatus using a first antenna; a second wireless communication unit configured to perform second wireless communication with the power transmission apparatus using a second antenna; a power reception unit configured to receive the power from the power transmission apparatus using the second antenna; a switching unit configured to switch a connection destination of the second antenna to the second wireless communication unit or the power reception unit; and a control unit configured to control the first wireless communication unit, the second wireless communication unit, and the switching unit, wherein when the first wireless communication unit is connected to the power transmission apparatus, the control unit controls the switching unit to switch the connection destination of the second antenna from the second wireless communication unit to the power reception unit, and communicates with the power transmission apparatus using the first wireless communication unit such that the power transmission apparatus starts transmitting power after the second antenna is connected to the power reception unit.

According to various embodiments the present disclosure, it is possible to receive power while switching the connection destination of an antenna at an appropriate time without increasing costs.

Further features of the present disclosure will become apparent from the following description of example embodiments (with reference to the attached drawings).

BRIEF DESCRIPTION OF THE DRAWINGS

FIGS. 1A and 1B are block diagrams illustrating the configurations of a power transmission apparatus and a power reception apparatus according to a present embodiment.

FIG. 2 is a flowchart illustrating first communication and power transmission/reception control by the power reception apparatus according to the present embodiment.

FIG. 4 is a flowchart illustrating third communication and power transmission/reception control by the power reception apparatus according to the present embodiment.

DESCRIPTION OF THE EMBODIMENTS

Figure 3:
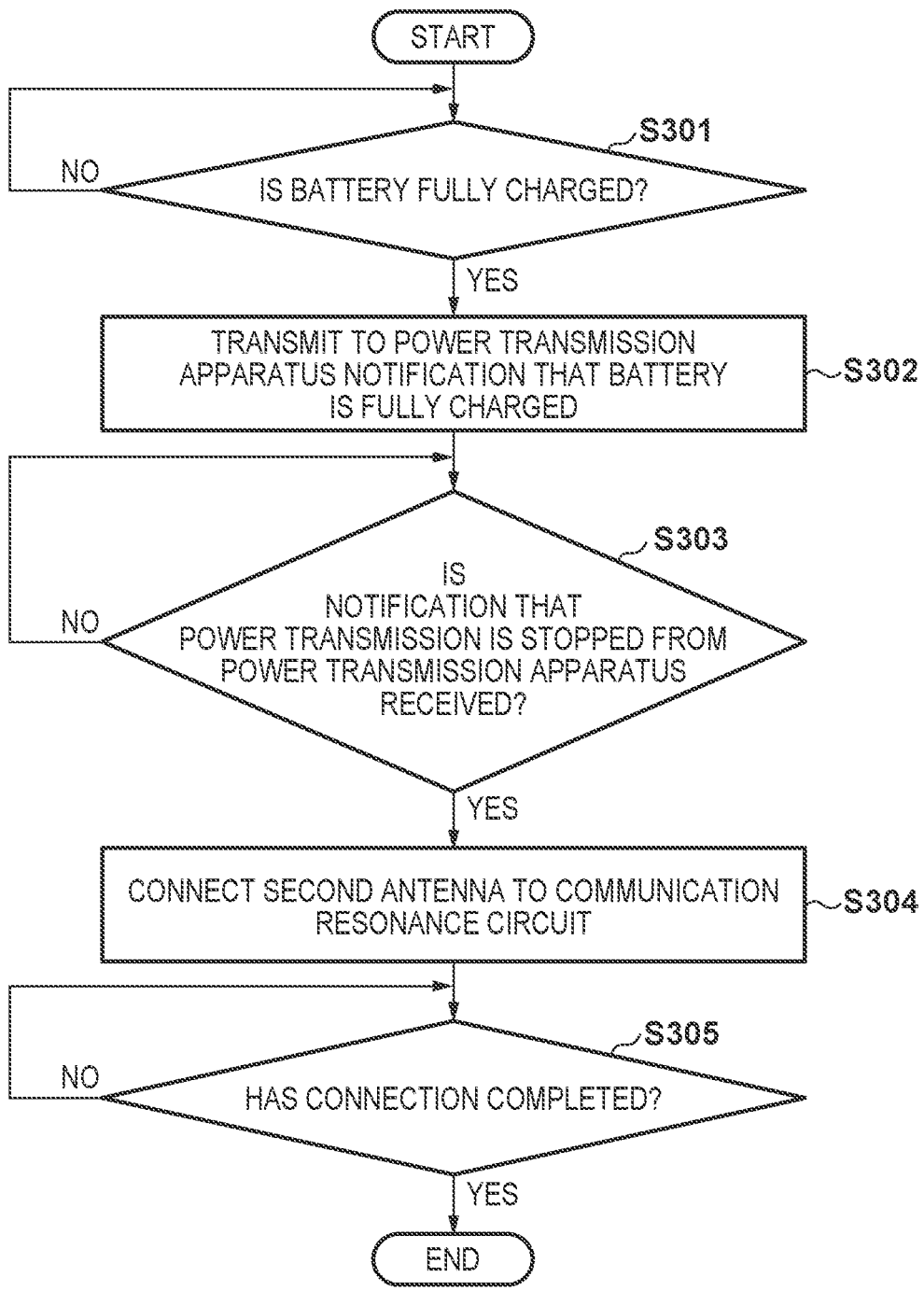
FIG. 3 is a flowchart illustrating second communication and power transmission/reception control by the power reception apparatus according to the present embodiment.

Hereinafter, embodiments will be described in detail with reference to the attached drawings. Note, the following embodiments are not intended to limit the scope of the claimed invention. Multiple features are described in the embodiments, but limitation is not made to embodiments that require all such features, and multiple such features may be combined as appropriate in an embodiment. Furthermore, in the attached drawings, the same reference numerals are given to the same or similar configurations, and redundant description thereof is omitted.

Apparatus Configuration

First, the configurations of a power reception apparatus 101 and a power transmission apparatus 201 according to the present embodiment will be described with reference to FIGS. 1A and 1B.

The power reception apparatus 101 is an electronic apparatus that receives power wirelessly transmitted from the power transmission apparatus 201. The power reception apparatus 101 is mobile while carried by a user, and can operate as a mobile terminal, including an image capturing apparatus such as a digital camera, a mobile phone such as a smartphone, a tablet device, a mobile game console, or the like, which uses a rechargeable battery as a power source.

The power reception apparatus 101 has a wireless communication function and a wireless charging function. The wireless communication function supports two standards, namely a second wireless communication method (e.g., Wi-Fi (registered trademark)) and a first wireless communication method having lower power consumption and lower communication speed than the second wireless communication method (e.g., Bluetooth (registered trademark)). A first antenna compliant with the first wireless communication method and a second antenna compliant with the second wireless communication method are provided.

The power reception apparatus 101 and the power transmission apparatus 201 are automatically connected by the first wireless communication method when in a positional relationship in which the apparatuses have approached a predetermined distance, and remain connected at all times until entering a positional relationship in which the apparatuses are separated from each other by a predetermined distance.

The power transmission apparatus 201 is a charging apparatus that can be operated by electricity constantly supplied from a household outlet or the like. The power transmission apparatus 201 wirelessly transmits power to the power reception apparatus 101.

Configuration of Power Reception Apparatus 101

First, the configuration of the power reception apparatus 101 according to the present embodiment will be described with reference to FIG. 1A.

FIG. 1A is a block diagram illustrating an example of the configuration of the power reception apparatus 101 according to the present embodiment. Note that in the following descriptions, the "external apparatus" is, for example, the power transmission apparatus 201, but is not limited thereto.

A control unit 118 includes memory storing programs for controlling the various constituent elements of the power reception apparatus 101, and a processor, such as a CPU or an MPU, that controls the various constituent elements of the power reception apparatus 101 by executing the programs stored in that memory.

The control unit 118 controls a switching unit 112, a second wireless communication unit 114, a first wireless communication unit 116, and a charging circuit 117, which will be described later.

A battery 119 is the power source that provides power for the power reception apparatus 101 to operate. The battery 119 is a rechargeable battery such as a lithium-ion battery, for example. The battery 119 supplies power to the various constituent elements of the power reception apparatus 101.

A first antenna 115 is a dedicated antenna having a configuration compliant with the first wireless communication method of the first wireless communication unit 116.

The first wireless communication unit 116 executes communication processing compliant with the first wireless communication method with the external apparatus over the first antenna 115. The first wireless communication method is a wireless communication standard having lower power consumption and lower communication speed than the second wireless communication method, which will be described later. The first wireless communication method performs low-volume (10 kbps) data communication while consuming little power (around 10 mW), such as, for example, Bluetooth (registered trademark), and communicates with the external apparatus continually without being disconnected.

A second antenna 111 includes an antenna element and is capable of transmitting and receiving radio waves to and from the external apparatus. The second antenna 111 has a configuration which enables the reception of power that is converted into radio waves and transmitted from the power transmission apparatus 201. The second antenna 111 is used as both a wireless communication antenna and a wireless power reception antenna.

The switching unit 112 is a switch that switches the connection destination of the second antenna 111 to a power reception resonance circuit 120 (a power reception unit 113) or a communication resonance circuit 121 (the second wireless communication unit 114) (described later). In a normal state or an initial state, the second antenna 111 is connected to the communication resonance circuit 121 (the second wireless communication unit 114). Then, in response to a control command from the control unit 118, the switching unit 112 switches the connection destination of the second antenna 111 from the communication resonance circuit 121 (the second wireless communication unit 114 to the power reception resonance circuit 120 (the power reception unit 113).

The power reception resonance circuit 120 is a circuit including elements such as coils and capacitors, and is designed to resonate at frequencies in the 2.4 GHz band, the 5.0 GHz band, and the like used in Wi-Fi (registered trademark), for example.

The power reception unit 113 is a rectifier circuit that converts a voltage of the power output from the power reception resonance circuit 120, rectifies the voltage to a DC voltage with which each constituent element of the power reception apparatus 101 can operate, and outputs the DC voltage to the charging circuit 117 in the subsequent stage.

The charging circuit 117 supplies power to the battery 119 and charges the battery 119. The charging circuit 117 converts the DC voltage output from the power reception unit 113 to a predetermined voltage for charging the battery 119, and supplies the power to the battery 119.

The communication resonance circuit 121 is a circuit including elements such as coils and capacitors, and like the power reception resonance circuit 120, is designed to resonate at frequencies in the 2.4 GHz band, the 5.0 GHz band, and the like used in Wi-Fi (registered trademark), for example.

The second wireless communication unit 114 executes communication processing compliant with the second wireless communication method with the external apparatus through the second antenna 111 and the communication resonance circuit 121. The second wireless communication method is a wireless communication standard having higher power consumption and higher communication speed than the first wireless communication method. The second wireless communication method performs high-volume (several tens of Mbps) data communication while consuming a large amount of power (around 100 mW), such as, for example, Wi-Fi (registered trademark).

Configuration of Power Transmission Apparatus 201

Next, the configuration and functions of the power transmission apparatus 201 according to the present embodiment will be described with reference to FIG. 1B.

FIG. 1B is a block diagram illustrating an example of the configuration of the power transmission apparatus 201 according to the present embodiment. Note that in the following descriptions, the "external apparatus" is, for example, the power reception apparatus 101, but is not limited thereto.

A control unit 218 includes memory storing programs for controlling the various constituent elements of the power transmission apparatus 201, and a processor, such as a CPU or an MPU, that controls the various constituent elements of the power transmission apparatus 201 by executing the programs stored in that memory.

The control unit 218 controls a switching unit 212, a second wireless communication unit 214, and a first wireless communication unit 216 (described later).

A first antenna 215 is a dedicated antenna having a configuration compliant with the first wireless communication method of the first wireless communication unit 216.

The first wireless communication unit 216 executes communication processing compliant with the first wireless communication method with the external apparatus over the first antenna 215. The first wireless communication method is a wireless communication standard having lower power consumption and lower communication speed, such as Bluetooth (registered trademark), than the second wireless communication method, which will be described later.

A second antenna 211 includes an antenna element and is capable of transmitting and receiving radio waves to and from the external apparatus. The second antenna 211 has a configuration which can convert power into radio waves and transmit the power to the power reception apparatus 101.

The switching unit 212 is a switch that switches the connection destination of the second antenna 211 to a power transmission resonance circuit 220 or a communication resonance circuit 221 (the second wireless communication unit 214) (described later).

The power transmission resonance circuit 220 and the communication resonance circuit 221 are circuits including elements such as coils and capacitors, and are designed to resonate at frequencies in the 2.4 GHz band, the 5.0 GHz band, and the like used in Wi-Fi (registered trademark), for example.

The second wireless communication unit 214 executes communication processing compliant with the second wireless communication method with the external apparatus through the second antenna 211 and the communication resonance circuit 221. The second wireless communication method is a wireless communication standard having higher power consumption and higher communication speed, such as Wi-Fi (registered trademark), than the first wireless communication method.

First Communication and Power Transmission/Reception Control

Next, first communication and power transmission/reception control performed by the power reception apparatus 101 according to the present embodiment will be described with reference to the flowchart in FIG. 2.

The processing in FIG. 2 is realized by the control unit 118 of the power reception apparatus 101 executing a program stored in the memory and controlling each constituent element of the power reception apparatus 101. The same applies to the processing in FIGS. 3 and 4.

In step S201, upon the power reception apparatus 101 approaching a predetermined distance from the power transmission apparatus 201, the control unit 118 receives, over the first antenna 115 of the power reception apparatus 101, a signal which the first wireless communication unit 216 of the power transmission apparatus 201 continually outputs over the first antenna 215.

In step S202, the control unit 118 establishes a connection between the first wireless communication unit 116 and the first wireless communication unit 216 of the power transmission apparatus 201 using the first wireless communication method, and communicable connects the power reception apparatus 101 and the power transmission apparatus 201.

In step S203, the control unit 118 receives a request for information transmitted from the first wireless communication unit 216 of the power transmission apparatus 201 over the first antenna 215. The information requested from the power transmission apparatus 201 is, for example, information about a charge state of the battery 119 of the power reception apparatus 101, an operating state (operating, powered off, or the like), the power to be transmitted, and the frequency of the radio waves for transmitting power.

In step S204, the control unit 118 uses the switching unit 112 to switch the connection destination of the second antenna 111 to the power reception resonance circuit 120.

In step S205, upon determining that the second antenna 111 is connected to the power reception unit 113 via the power reception resonance circuit 120, the control unit 118 advances the processing to step S206.

In step S206, the control unit 118 generates data in response to the request for the information received from the power transmission apparatus 201 in step S203, and transmits the data from the power reception apparatus 101 to the power transmission apparatus 201, from the first wireless communication unit 116 over the first antenna 115.

In step S207, the control unit 218 starts receiving power transmitted from the power transmission apparatus 201 at a power, frequency, and the like corresponding to the data in the response received by the power transmission apparatus 201 from the power reception apparatus 101.

According to the first communication and power transmission/reception control, power transmission from the first antenna 215 of the power transmission apparatus 201 is started in a state where the second antenna 111 of the power reception apparatus 101 is connected to the power reception unit 113 via the power reception resonance circuit 120. Accordingly, overvoltage caused by power reception can be prevented from being applied to the second wireless communication unit 114 of the power reception apparatus 101.

Second Communication and Power Transmission/Reception Control

Next, second communication and power transmission/reception control performed by the power reception apparatus 101 according to the present embodiment will be described with reference to the flowchart in FIG. 3.

In step S301, the control unit 118 receives, over the second antenna 111, the power transmitted from the second wireless communication unit 214 of the power transmission apparatus 201 over the second antenna 211. Then, the control unit 118 charges the battery 119 using the power output to the charging circuit 117 via the power reception resonance circuit 120 and the power reception unit 113. Upon detecting an output voltage of the battery 119 and determining that the battery 119 is fully charged, the control unit 118 advances the processing to step S302.

In step S302, the control unit 118 transmits information providing a notification that the battery 119 is fully charged to the power transmission apparatus 201 from the first wireless communication unit 116 over the first antenna 115.

When the power transmission apparatus 201 receives the information providing the notification that the battery 119 is fully charged, the control unit 218 of the power transmission apparatus 201 stops the power transmission, and transmits, to the power reception apparatus 101, information providing a notification that the power transmission has stopped, from the first wireless communication unit 216 over the first antenna 215.

In step S303, when the first wireless communication unit 116 receives the information providing the notification that power transmission has stopped from the power transmission apparatus 201 over the first antenna 115, the control unit 118 advances the processing to step S304.

In step S304, the control unit 118 instructs the switching unit 112 to switch the connection destination of the second antenna 111 to the communication resonance circuit 121.

In step S305, upon determining that the switch by the switching unit 112 is complete and the second antenna 111 is connected to the communication resonance circuit 121, the control unit 118 ends the processing.

According to the second communication and power transmission/reception control, the second antenna 111 of the power reception apparatus 101 is connected to the communication resonance circuit 121 after the power transmission from the power transmission apparatus 201 is stopped, and thus overvoltage caused by power reception can be prevented from being applied to the second wireless communication unit 114 of the power reception apparatus 101.

Third Communication and Power Transmission/Reception Control

Next, third communication and power transmission/reception control performed by the power reception apparatus 101 according to the present embodiment will be described with reference to the flowchart in FIG. 4.

In FIG. 4, steps S201 to S204 and steps S205 to S207 are the same as in FIG. 2, and will therefore not be described.

In step S401, the control unit 118 measures a time taken from the start to the end of the switching unit 112 switching the connection destination of the second antenna 111 to the power reception resonance circuit 120 in step S204. The control unit 118 then determines whether the time taken is greater than or equal to a predetermined time (e.g., 100 msec). If the time taken is determined to be greater than or equal to the predetermined time (e.g., 100 msec), the control unit 118 advances the processing to step S402, whereas if the time taken is determined to be less than the predetermined time (e.g., 100 msec), the control unit 118 advances the processing to step S205.

In step S402, the control unit 118 transmits information making a notification, indicating that the switch by the switching unit 112 is complete and the second antenna 111 is connected to the power reception resonance circuit 120, from the first wireless communication unit 116 to the power transmission apparatus 201 over the first antenna 115. The power transmission apparatus 201 does not start power transmission until the information is received from the power reception apparatus 101 providing a notification that the second antenna 111 is connected to the power reception resonance circuit 120, and at the same time, even if a response has not been received for greater than or equal to the predetermined time after transmitting the request to the power reception apparatus 101 in step S203, the communication is not cut off due to a timeout.

According to the third communication and power transmission/reception control, communication being cut off due to a timeout can be avoided even when the power transmission apparatus 201 has not received a response for greater than or equal to a predetermined time following the transmission of a request to the power reception apparatus 101, and a stable connection can be made even when the processing for switching the connection destination of the second antenna 111 to the power reception resonance circuit 120 in the power reception apparatus 101 takes a long time.

Other Embodiments

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While example embodiments have been described, it is to be understood that the disclosure is not limited to the disclosed example embodiments. The scope of the following claims is to be accorded the broadest interpretation so as to encompass all such modifications and equivalent structures and functions.

This application claims the benefit of Japanese Patent Application No. 2021-166917, filed Oct. 11, 2021 which is hereby incorporated by reference herein in its entirety.

What is claimed is:

1. A power reception apparatus that receives power wirelessly transmitted from a power transmission apparatus, the power reception apparatus comprising:
   a first wireless communication unit configured to perform first wireless communication with the power transmission apparatus using a first antenna;
   a second wireless communication unit configured to perform second wireless communication with the power transmission apparatus using a second antenna;
   a power reception unit configured to receive the power from the power transmission apparatus using the second antenna;
   a switching unit configured to switch a connection destination of the second antenna to the second wireless communication unit or the power reception unit; and
   a control unit configured to control the first wireless communication unit, the second wireless communication unit, and the switching unit,
   wherein when the first wireless communication unit is connected to the power transmission apparatus, the control unit controls the switching unit to switch the connection destination of the second antenna from the second wireless communication unit to the power reception unit, and communicates with the power transmission apparatus using the first wireless communication unit such that the power transmission apparatus starts transmitting power after the second antenna is connected to the power reception unit.

2. The power reception apparatus according to claim 1, wherein when, after a connection with the power transmission apparatus is established using the first wireless communication unit, a notification requesting information about the power reception apparatus is received from the power transmission apparatus, the control unit controls the switching unit such that the second antenna connected to the second wireless communication unit is connected to the power reception unit.

3. The power reception apparatus according to claim 2, wherein after the second antenna is connected to the power reception unit, the control unit transmits a response to the request and starts receiving power from the power transmission apparatus.

4. The power reception apparatus according to claim 1, wherein when a time taken to connect the second antenna to the power reception unit is greater than or equal to a predetermined time, the control unit notifies the power transmission apparatus that the second antenna has been connected to the power reception unit.

5. The power reception apparatus according to claim 1, further comprising:
   a charging unit configured to charge a battery using the power received from the power transmission apparatus,
   wherein the control unit transmits a notification that the battery is fully charged to the power transmission apparatus using the first wireless communication unit, and
   when a notification indicating that power transmission from the power transmission apparatus has stopped is received using the first wireless communication unit, the control unit controls the switching unit such that the second antenna connected to the power reception unit is connected to the second wireless communication unit.

6. The power reception apparatus according to claim 1, wherein the first wireless communication unit performs wireless communication at a lower power consumption and a lower communication speed than the second wireless communication unit, and
   the second antenna is used both as an antenna for the second wireless communication and as an antenna for receiving power from the power transmission apparatus.

7. A method of controlling a power reception apparatus that receives power wirelessly transmitted from a power transmission apparatus,
   wherein the power reception apparatus comprises:
   a first wireless communication unit configured to perform first wireless communication with the power transmission apparatus using a first antenna;
   a second wireless communication unit configured to perform second wireless communication with the power transmission apparatus using a second antenna;
   a power reception unit configured to receive the power from the power transmission apparatus using the second antenna;
   a switching unit configured to switch a connection destination of the second antenna to the second wireless communication unit or the power reception unit; and
   a control unit configured to control the first wireless communication unit, the second wireless communication unit, and the switching unit, and
   the method comprises:
   when the first wireless communication unit is connected to the power transmission apparatus, controlling the switching unit to switch the connection destination of the second antenna from the second wireless communication unit to the power reception unit; and
   communicating with the power transmission apparatus using the first wireless communication unit such that the power transmission apparatus starts transmitting power after the second antenna is connected to the power reception unit.

8. A non-transitory computer-readable storage medium storing a program for causing a processor to function as a power reception apparatus that receives power wirelessly transmitted from a power transmission apparatus, the power reception apparatus comprising:
   a first wireless communication unit configured to perform first wireless communication with the power transmission apparatus using a first antenna;

a second wireless communication unit configured to perform second wireless communication with the power transmission apparatus using a second antenna;
a power reception unit configured to receive the power from the power transmission apparatus using the second antenna;
a switching unit configured to switch a connection destination of the second antenna to the second wireless communication unit or the power reception unit; and
a control unit configured to control the first wireless communication unit, the second wireless communication unit, and the switching unit,
wherein when the first wireless communication unit is connected to the power transmission apparatus, the control unit controls the switching unit to switch the connection destination of the second antenna from the second wireless communication unit to the power reception unit, and communicates with the power transmission apparatus using the first wireless communication unit such that the power transmission apparatus starts transmitting power after the second antenna is connected to the power reception unit.

* * * * *